United States Patent [19]

Bolto et al.

[11] 4,451,581

[45] May 29, 1984

[54] ION EXCHANGE RESIN

[75] Inventors: Brian A. Bolto, Mitcham; Mervyn B. Jackson, West Brunswick, both of Australia

[73] Assignees: ICI Australia Ltd., Victoria; Commonwealth Scientific and Industrial Research Organization, Campbell, both of Australia

[21] Appl. No.: 432,919

[22] PCT Filed: Mar. 22, 1982

[86] PCT No.: PCT/AU82/00037

§ 371 Date: Sep. 27, 1982

§ 102(e) Date: Sep. 27, 1982

[87] PCT Pub. No.: WO82/03398

PCT Pub. Date: Oct. 14, 1982

[30] Foreign Application Priority Data

Mar. 27, 1981 [AU] Australia .............................. PE8173

[51] Int. Cl.³ .......................... B01J 39/18; B01J 43/00

[52] U.S. Cl. ......................................... 521/28; 521/34

[58] Field of Search ............................ 521/28, 34, 25

[56] References Cited

U.S. PATENT DOCUMENTS

| 3,205,184 | 9/1965 | Hatch | 521/28 |
| 3,706,707 | 12/1972 | Vandenburg | 521/25 |

FOREIGN PATENT DOCUMENTS

| 50-17499 | 2/1975 | Japan | 521/25 |
| 55-27327 | 2/1980 | Japan | 521/28 |
| 201648 | 5/1975 | U.S.S.R. | 521/34 |

Primary Examiner—Joseph L. Schofer
Assistant Examiner—Peter F. Kulkosky
Attorney, Agent, or Firm—Cushman, Darby & Cushman

[57] ABSTRACT

Thermally regenerable ion exchange resins, which are oxidation resistant, comprising polyetheramines derived from a poly ($\alpha$-haloepoxyethane) which has been crosslinked and aminated.

16 Claims, No Drawings

ION EXCHANGE RESIN

TECHNICAL FIELD

This invention relates to thermally regenerable ion-exchange resins and more especially it relates to such resins of the composite amphoteric type.

It is known that saline solutions may be demineralized at least in part by treating them with resinous material capable of acting as an ion-exchange material. One such method whereby saline solutions may be demineralized is one in which the resinous material is a thermally regenerable resin. Processes in which such resins are used are for example Australian Pat. Nos. 274,029 and 434,130.

BACKGROUND ART

One useful class of thermally regenerable ion-exchange resins suitable for demineralizing saline solutions is a class comprising composite amphoteric resins containing particles of both an acidic ion exchange polymeric component and a basic ion exchange polymeric component. A particularly useful class of composite amphoteric resins is the class comprising discrete acidic and basic domains grouped together in a particle or bead of essentially spherical form, with a diameter in a range from about 300 to 1200 microns. From within the above class of resins an effective subclass is one in which the resins are known as "active-matrix" resins. By the term "active-matrix" resins is meant resins obtained by a process in which two polymer precursors, such as monomers, are polymerized to give a resin in which the matrix is a mosaic of both the acidic polymer component and the basic polymeric component.

It will be appreciated that such an active-matrix may be formed by the simultaneous polymerization of both monomers. In instances where the rates of polymerization of the monomers are different then the matrix is formed, for example, by polymerizing a slowly polymerizing acidic monomer around particles of a faster polymerizing basic polymer or vice versa. In a variation of the above methods of manufacture such active-matrix resins may be made by polymerizing a monomer 'X', in the presence of a preformed polymer 'Y', which is, for example, in particulate or celled form and thereby encapsulating the preformed polymer 'Y' particles in a matrix derived from the in situ polymerization of the monomeric component 'X'.

Alternatively porous particles of preformed polymer 'A' may be impregnated with a monomer 'B' which is then polymerized within the 'A' particles. In this instance the matrix, or continuous, phase will be provided by the preformed 'A' polymer in contradistinction to the type described above in which the preformed 'Y' polymer particles provide the discontinuous phase.

The active-matrix resins referred to herein are distinct from the so-called "plum pudding" resins described in the specification of Australian Pat. No. 434,130 and which comprise composite ion-exchange resins in particulate form and contain discrete particles of acidic and basic polymeric ion-exchange materials dispersed in an inert matrix of water insoluble polymeric materials.

The useful operating life of both "active-matrix" and "plum-pudding" resins is dependent upon the vulnerability of the resins to degradation by oxidation. The basic polymer component is particularly susceptible to oxidation, especially during the regeneration stage which involves treatment of the loaded resin with a hot, saline, solution. Prevention of such oxidation involves further operations which are both inconvenient and costly. For example the oxygen can be removed from the feed waters by chemical dosing or vacuum deaeration. Chemical dosing generally involves the addition of sodium sulphite. It is generally necessary to deoxygenate both the cold water feed and the hot regenerant feed because of the high level of sensitivity of the known systems to oxygen.

It is an object of the present invention to provide improved thermally regenerable ion exchange resins of the composite amphoteric type that are resistant to oxygen and therefore avoid the necessity for these operations.

DISCLOSURE OF INVENTION

We have now found that thermally regenerable amphoteric ion exchange resins having a high ion exchange capacity and a high degree of resistance to oxidation are those which contain, as a basic polymeric component, a polyetheramine such as is derived from a polyepihalohydrin which is crosslinked and aminated.

Accordingly the present invention provides a thermally regenerable amphoteric ion exchange resin comprising an acidic ion-exchange polymeric component and a basic ion-exchange polymeric component wherein said basic ion-exchange polymeric component is a polyetheramine derived from a poly($\alpha$-haloepoxyalkane) or a copolymer thereof which has been crosslinked and aminated.

In a further embodiment of our invention we provide a process for preparing the basic ion exchange polymeric component which process comprises the steps of crosslinking and aminating a poly($\alpha$-haloepoxyalkane) or a copolymer thereof.

The poly($\alpha$-haloepoxy alkane) may be derived from any of the available $\alpha$-haloepoxyalkane monomers, such as, for example, epibromohydrin, epiiodohydrin, 1-chloro-2,3-epoxypropane, 1-bromo-2,3-epoxy-2-methylpropane, 2-chloro-3,4-epoxyhexane and 2-bromo-3,4-epoxy-4-methylpentane. The nature of the halo is not narrowly critical but the chloro is usually preferred because of the availability of the $\alpha$-chlorohaloepoxyalkanes. The preferred $\alpha$-haloepoxyalkane is epichlorohydrin or the closely related 1,4-dichloro-2,3-epoxyethane. Poly(epichlorohydrin) is readily available commercially.

Copolymers of poly($\alpha$-haloepoxyalkane) may also be used to form the polyetheramine, for example the product of copolymerizing epichlorohydrin with ethylene oxide or propylene oxide. The polymers may be atactic or isotactic.

The polyetheramine is made by treating the poly($\alpha$-haloepoxyalkane) or one of its copolymers with a crosslinking agent which reacts with some of the chlorine groups in the molecular chains thereby crosslinking the chains together. The remaining chloro groups in the chains are replaced by reacting them with a primary or secondary amine to form the basic ion exchange functional groups.

The crosslinking agents are selected from known crosslinking agents containing two or more functional groups which are capable of reacting with the halo groups in the poly($\alpha$-haloepoxyalkane) from which the polyetheramine is derived. Such crosslinking agents include thiols, such as the aliphatic compounds 1,2- ethanedithiol, 1,3-propanedithiol, 1,4-butanedithiol and the aromatic compounds 1,3-dithiolbenzene and toluene-3,4-dithiol, the alkali salts of dihydroxy compounds and hydroquinone, and thioureas such as ethylene thiourea and trimethylenethiourea. Preferably the crosslinking agents are amines, such as ethylene diamine, 1,4-diaminobutane, 1,6-diaminohexane, triethylenetetramine, tetraethylene pentamine, bis-(3-aminopropylamine, 1,4-di-(N-methylamino)butane, 1,6-di-(N-methylamino)hexane and piperazine, either as the free base or as their salts.

The primary and secondary amines which are reacted with the halo groups remaining after crosslinking may be any of the known primary and secondary amines which are capable of reacting with the halogen groups in the poly(α-haloepoxyalkane). Examples of suitable amines are methylamine, ethylamine and higher homologues, dimethylamine, diethylamine, methylethylamine and higher homologues, pyrrolidine, piperidine and homopiperidine.

In preparing the polyetheramine the steps of crosslinking and aminating may be carried out simultaneously but preferably the crosslinking is carried out before the amination since better control of the polyetheramine can be maintained thereby.

The polyetheramine component of the amphoteric ion exchange resins of the present invention may be preformed and then incorporated into the resin, or it may be formed simultaneously with the other components, or preferably, it is formed, in situ, in the resin. In this last, preferred embodiment, the poly(α-haloepoxyalkane) is brought into contact with the other preformed component or components of the product resin and the crosslinking and aminating steps carried out on the mixture.

The amphoteric ion exchange resins of this invention may either be of the "plum pudding" type or the "active matrix" type, as have been described previously. In the embodiment of the invention when the product is to be a "plum-pudding" type resin the polyetheramine is made from an appropriate polymer which is crosslinked to form small solid particles which are then aminated to form polyetheramine particles. These particles together with appropriate acidic polymeric particles are embedded in an inert matrix to form "plum-pudding" resin particles of the desired amphoteric ion exchange resin.

The "active matrix" resins, which are the preferred form of the product of the invention, comprise two phases, a continuous or host phase, and a discontinuous phase. In the products of the present invention the polyetheramine component may provide either type of phase.

In one embodiment of the invention wherein the polyetheramine acts as the continuous phase, small particles of an acidic polymeric ion exchange material are encapsulated in the polyetheramine by suspending the particles in a liquid phase comprising poly(α-haloepoxyalkane) and a crosslinking agent. The poly(α-haloepoxyalkane) is thereby crosslinked encapsulating the acidic polymeric ion-exchange particles. The thus-formed amphoteric particles are aminated to increase their basic ion exchange capacity.

In a second embodiment wherein the polyetheramine is present as the discontinuous phase, porous acidic ion exchange particles are impregnated with poly(α-haloepoxyalkane) and a crosslinking agent in solution. After fixing the poly(α-haloepoxyalkane) in the pores by crosslinking it, the impregnated particles are aminated by known techniques to increase their basic ion exchange capacity.

The characterizing polyetheramine component of the resins of the present invention is compatible with, and may be used with, the acidic ion exchange components generally used in thermally regenerable amphoteric resins. The monomeric materials from which these acidic ion exchange components are made are varied and well known. Preferred monomers include ethylenically unsaturated carboxylic acids, such as acrylic acid, methacrylic acid, maleic acid, itaconic acid, crotonic acid, or vinyl benzoic acid. Alternatively, derivatives of such monomers such as an ester, anhydride or nitrile which can be converted into the desired weak acid functionality by hydrolysis can be used. Typical examples of such derivatives include methyl acrylate, maleic anhydride or acrylonitrile. It is often desirable to crosslink such acidic polymeric components and under these circumstances it is convenient to have from 0.5 to 10% of a polyvinyl crosslinking agent present with the acidic monomer during the polymerization step. Suitable polyvinyl crosslinking agents include divinylbenzene divinylpyridine, divinyltoluene, divinylnaphthalene, diallyl phthalate, ethylene glycol diacrylate, ethyleneglycol dimethylacrylate, diallyl succinate or N,N'-methylenediacrylamide. Particularly suitable acidic polymeric components are those prepared by polymerization of acrylic or methacrylic acid optionally crosslinked by the use of divinylbenzene.

BEST MODE OR CARRYING OUT THE INVENTION

The molar ratio of poly(α-haloepoxyalkane) to crosslinking agent is preferably in the range of 2:1 to 20:1, and most preferably in the range of 4:1 to 8:1.

In the most preferred embodiment of our invention the polyetheramine is derived from poly(epihalohydrin) which has been crosslinked with a diamine in which the crosslinking amine groups are separated by at least four atoms or groups which do not react with the halo groups, for example four carbon atoms. Suitable amines include, for example, 1,4-diaminobutane and 1,6-diaminohexane.

The most preferred amphoteric ion exchange resins of our invention are the active matrix type wherein the basic polyetheramine component is incorporated by the process of Australian Pat. No. 520,202.

INDUSTRIAL APPLICABILITY

The invention provides a significant advance in the technology relating to the manufacture and use of thermally regenerable ion exchange resins. The resins of the invention are such that it is now practical to use them for the demineralization of saline solutions over prolonged periods since they are receptive to repetitive desalination and thermal regeneration cycles without being degraded by oxidative processes in the manner in which thermally regenerable amphoteric ion exchange resins have been in the past. Moreover, in particular those "active-matrix" resins of the present invention in which the polyetheramine is the discontinuous phase have the advantage of being physically strong and having a high ion exchange capacity on a volume basis.

The invention is now illustrated by but is not limited to the following examples in which all parts and percentages are expressed on a weight basis unless otherwise specified.

EXAMPLE 1

This example illustrates an "active-matrix" resin according to the invention in which the continuous phase is supplied by the polyetheramine component. Finely-ground weak acid ion exchange resin (6 g) loaded with barium ions was dispersed in a mixture of 6 g of liquid poly(epichlorohydrin), 2.90 g of piperazine and 5 g of n-propanol by means of an ultrasonic homogenizer. The dispersion was added to 100 ml of paraffin oil containing 0.4 g of a copolymer of octadecyl methacrylate and hydroxyethyl methacrylate (9:1 mole ratio), and the mixture stirred for five hours at a temperature of 106° C. The resulting beads, approximately 300 µm in diameter, were washed with hexane, dried, washed with dilute hydrochloric acid, and again dried. A portion was further washed with sodium hydroxide solution, then water and again dried.

1 g of the base-washed portion was aminated by refluxing for 24 hours in 3 ml of 1,4-dioxane containing 1.21 g of piperidine, then washed and dried.

Capacity measurements on the beads gave the following results:

TABLE 1

| Resin | Carboxyl | Amine | Thermally Regenerable |
| --- | --- | --- | --- |
| unaminated, acid washed | 4.70 meq/g | 1.04 meq/g | — |
| unaminated, base washed | 3.94 meq/g | 0.74 meq/g | — |
| aminated, acid washed | 3.81 meq/g | 2.36 meq/g | 0.62 meg/g (0.16 meq/ml) |

EXAMPLE 2

This example illustrates an active matrix resin having its polyetheramine component as the discontinuous phase.

Poly(epichlorohydrin) 'Hycar' HTE 2216×1 ('Hycar' is a registered trade name) (1.0 g) was dissolved in toluene (0.25 ml) and methanol (0.25 ml) added. After dissolving piperazine (0.233 g) in this solution, polyacrylic acid resin beads, 'Duolite' C464 ('Duolite' is a registered trade name) as the dimethylamine salt, were added. The sample was put under vacuum overnight and then warmed to achieve maximum penetration of the solution into the macroporous beads and then heated at 60° C. for 24 hours at atmospheric pressure. The resin was washed with water, 0.3N KOH and water and dried. Further crosslinking was achieved by adding the resin to a solution of 1,6-diaminohexane (0.314 g) in toluene (5 ml). Vacuum was applied to remove the air bubbles and ensure penetration into the beads and then heated at 95° C. in an oil bath for 24 hours at atmospheric pressure.

The beads were filtered off, washed with ethanol, and then washed by heating with water three times. Chloride was removed by stirring with 0.3N KOH. The beads were finally rinsed with water and dried in vacuo.

The dried resin beads were heated in a solution of piperidine (7 ml) in toluene (7 ml) in an autoclave at 105° for 18 hours and then washed successively with ethanol, water, 2N HCl, 0.001N HCl and dried.

The dried resin had an acid capacity of 5.20 meq/g, a base capacity of 1.76 meq/g and a thermally regenerable capacity of 0.92 meq/g (0.17 meq/ml). After oxidation for 5 days at 80° C. the acid and base capacities were 5.36 and 1.74 meq/g, respectively.

EXAMPLE 3

This example illustrates a similar active matrix resin to that of Example 2 but with a different acidic ion exchange component.

Poly(epichlorohydrin) (1.0 g) was dissolved in toluene (0.5 ml) and 1,6-diaminohexane (0.314 g) dissolved in the mixture. Polyacrylonitrile resin beads (1.6 g) were added to the solution and absorption was aided by subjecting the tube to vacuum and warming to 60° C. Crosslinking was done at atmospheric pressure by heating at 95° C. for 24 hours. The beads were successively washed with warm water, 0.3N NaOH, water and dried and then added to a solution of 1,6-diaminohexane (0.314 g) in toluene (5 ml). Vacuum was applied to ensure penetration into the beads and then the mixture was heated at 95° C. under a nitrogen atmosphere for 24 hours. The product was washed with ethanol, heated with three portions of water, washed with 0.3N NaOH until free of chloride, washed with water, and dried. The dried resin was added to a solution of piperidine (7 ml) in toluene (7 ml) and heated in an autoclave at 105° C. for 18 hours and then washed successively with ethanol, water and 0.3N NaOH. The resin was hydrolyzed by stirring with 20% aqueous NaOH (30 ml) at 95° for 24 hours under nitrogen and then washed successively with water, 2N HCl and 0.001N HCl. The resin had acid, base and thermally regenerable capacities of 2.29, 1.78 and 0.53 meq/g (0.19 meq/ml), respectively.

A polyetheramine was prepared by crosslinking poly(epichlorohydrin) with 1,6-diaminohexane (4:1 molar ratio) and further aminating with piperidine. It had an amine capacity of 6.4 meq/g and lost 0.3% capacity per day on oxidation.

EXAMPLE 4

Poly(epichlorohydrin) (1.0 g) was dissolved in toluene (0.25 ml) and n-propanol (0.25 ml) added. Piperazine (0.155 g) was dissolved in this solution and polyacrylic acid beads (K salt form) containing magnetic particulate matter were added. The mixture was put under vacuum and warmed and then heated at 95° C. for 24 hours at atmospheric pressure. The beads were washed with hot water, 0.3N KOH, water and dried. The dried resin was added to a solution of 1,6-diaminohexane (0.314 g) in toluene (10 ml) and heated at 105° C. for 19 hours and washed successively with hot water, 0.3N KOH, water and dried. The dried resin was heated in a solution of piperidine (7 ml) and toluene (7 ml) in an autoclave at 105° C. for 18 hours and washed successively with ethanol, hot water, 2N HCl, 0.001N HCl and dried. The resin had acid, base and thermally regenerable capacities of 2.46, 1.28 and 0.67 meq/g (0.18 meq/ml), respectively. After oxidation for 5 days at 80° the respective capacities were 2.47, 1.33 and 0.64 meq/g.

EXAMPLE 5

Poly(epichlorohydrin) ('Hycar' HTE 2216×2, 18.4 g) was dissolved in toluene (28 ml) with warming and 1,6-diaminohexane (3.8 g) was added. The mixture was stirred until the amine was dissolved, and heated in an oil bath at 100° C. for 24 hours. The product was cooled and stirred in a high speed homogenizer with toluene and then washed successively in a sintered glass column with toluene (40 ml), ethanol (2×50 ml), water (2×50 ml), 2N HCl (8 hours), 0.3N NaOH until free of chloride, water until neutral and dried in vacuo at 50° C.

A sample of this product (3 g) was mixed with piperidine (12 ml) in toluene (10 ml) and heated at 106° C. for 40 hours. The cooled product was washed successively with toluene, ethanol, water, 2N HCl, 0.3N NaOH, water and dried in vacuo at 50° C. The results are given in Table 2.

EXAMPLE 6

The procedure of Example 5 was repeated except that the piperidine was replaced by an equal weight of dimethylamine. The results are given in Table 2.

EXAMPLE 7

The procedure of Example 5 was repeated except that the piperidine was replaced with an equal weight of homopiperidine. The results are given in Table 2.

EXAMPLE 8

The procedure of Example 5 was repeated except that the piperidine was replaced by an equal weight of di-n-propylamine and, since only half of the available chlorine was reacted with the di-n-propylamine, the product was further heated with piperidine (12 ml) in toluene (10 ml) at 106° C. for 40 hours before the washing procedure. The results are given in Table 2.

EXAMPLE 9

The procedure of Example 8 was repeated except that the piperidine was replaced with dimethylamine. The results are given in Table 2.

TABLE 2

| Example | Amine | ΔpH* | Capacity loss per day on oxidation at 80° C. in the presence of oxygen (%) |
|---|---|---|---|
| 5 | piperidine | 1.1 | 0.3 |
| 6 | dimethylamine | 1.4 | 0.4 |
| 7 | homopiperidine | 0.6 | 1.0 |
| 8 | di-n-propylamine/ piperidine | 0.6 | 0.0 |
| 9 | di-n-propylamine/ dimethylamine | 1.0 | 0.0 |

*ΔpH is the difference in the pH values of the titration curve at the degree of ionization $\alpha = 0.3$ and $\alpha = 0.7$ and is a measure of suitability of the resins for thermally regenerable ion-exchange processes. ("An Ion Exchange Process with Thermal Regeneration", Part IV, Australian J. Chem. (1966) 19 765).

We claim:

1. A thermally regenerable amphoteric ion-exchange resin comprising an acidic ion-exchange polymeric component and a basic ion-exchange polymeric component, characterized in that the basic polymeric component is a polyetheramine which is prepared from a poly(α-halo-epoxyalkane) or a copolymer thereof, by treatment with an aminating agent selected from the group consisting of methylamine, ethylamine, dimethylamine, diethylamine, methylethylamine, pyrrolidine, piperidine and homopiperidine, and a crosslinking agent which is a diamine or a salt thereof.

2. A resin according to claim 1 wherein the poly(α-haloepoxyalkane) is a poly(epihalohydrin).

3. A resin according to claim 2 wherein the poly(epihalohydrin) is poly(epichlorohdyrin).

4. A resin according to claim 1 wherein the poly(α-haloepoxyalkane) is selected from the group consisting of 1-chloro-2,3-epoxypropane, 1-bromo-2,3-epoxy-2-methyl-1-propane, 2-chloro-3,4-epoxyhexane, 2-bromo-3,4-epoxy-4-methylpentane and 1,4-dichloro-2,3-epoxyethane.

5. A resin according to any one of claims 1 to 4 wherein the copolymer is the product of copolymerizing a poly(α-haloepoxyalkane) with an alkylene oxide selected from ethylene oxide and propylene oxide.

6. A resin according to any one of claims 1 to 4 wherein the amino groups of the diamine are separated by at least four carbon atoms.

7. A resin according to any one of claims 1 to 4 wherein the diamines are selected from the group consisting of ethylene diamine, triethylenetetramine, tetraethylenepentamine, bis-(3-aminopropyl) amine and piperazine.

8. A resin according to claim 6 wherein the diamines are selected from the group consisting of 1,4-diaminobutane, 1,6-diaminohexane, 1,4-di(N-methylamino)butane, and 1,6-di(N-methylamino)hexane.

9. A resin according to claim 6 wherein the diamine is 1,6-diaminohexane.

10. A resin according to any one of claims 1 to 4 wherein the molar ratio of poly(α-haloepoxyalkane) to crosslinking agent is in the range from 2:1 to 20:1.

11. A resin according to claim 10 wherein the range is 4:1 to 8:1.

12. A resin according to claim 1 wherein the acidic and basic polymeric components are embedded in an inert matrix.

13. A resin according to claim 1 wherein one of the polymeric components is embedded in a matrix of the other polymeric component.

14. A resin according to claim 13 wherein the acidic polymeric component is derived from one or more monomers selected from the group consisting of acrylic acid, methacrylic acid, maleic acid, itaconic acid, crotonic acid and vinylbenzoic acid, and ester, anhydride or nitrile derivatives thereof.

15. A resin according to claim 1 wherein the acidic polymeric component is prepared by polymerization of acrylic or methacrylic acid optionally crosslinked with divinylbenzene.

16. A process of preparing the thermally regenerable amphoteric ion-exchange resin of claim 1 which process comprises the steps of crosslinking a poly(α-haloepoxyalkane) with a crosslinking agent to form a crosslinked product and aminating the crosslinked product.

* * * * *